United States Patent [19]

Cherukuri et al.

[11] Patent Number: 4,971,806

[45] Date of Patent: Nov. 20, 1990

[54] MULTI-LAYERED CHEWING GUM COMPOSITION HAVING DIFFERENT RATES OF FLAVOR RELEASE

[75] Inventors: Subraman R. Cherukuri, Towaco, N.J.; Frank T. Hriscisce, Long Island City; Kenneth P. Bilka, Floral Park, both of N.Y.

[73] Assignee: Warner-Lambert Company, Morris Plains, N.J.

[21] Appl. No.: 449,084

[22] Filed: Dec. 8, 1989

Related U.S. Application Data

[63] Continuation of Ser. No. 109,963, Oct. 19, 1987, abandoned, which is a continuation-in-part of Ser. No. 816,949, Jan. 6, 1986, abandoned, which is a continuation of Ser. No. 575,609, Jan. 31, 1984, abandoned.

[51] Int. Cl.$^5$ .............................................. A23G 3/30
[52] U.S. Cl. .......................................... 426/5; 426/103
[58] Field of Search ........................... 426/5, 3, 103

[56] References Cited

U.S. PATENT DOCUMENTS

| | | | |
|---|---|---|---|
| 1,193,423 | 8/1916 | Pryor | 426/5 |
| 1,771,982 | 7/1930 | Mustin | 426/5 |
| 3,644,169 | 2/1972 | Phillips | 426/5 |
| 4,139,589 | 2/1979 | Beringer | 426/5 |
| 4,217,368 | 8/1980 | Witzel | 426/5 |
| 4,352,823 | 10/1982 | Cherukuri et al. | 426/5 |
| 4,352,824 | 10/1982 | Puglia et al. | 426/5 |
| 4,352,825 | 10/1982 | Cherukuri et al. | 426/5 |
| 4,399,154 | 8/1983 | Puglia | 426/5 |
| 4,485,118 | 11/1984 | Carroll et al. | 426/5 |
| 4,656,039 | 4/1987 | Weiss | 426/5 |

Primary Examiner—Jeanette Hunter
Attorney, Agent, or Firm—Daniel A. Scola, Jr.; Craig M. Bell

[57] ABSTRACT

A multi-layered chewing gum composition is disclosed. The composition has a moisture content of less than about 1% by weight of the composition and contains at least two layers each comprising a chewing gum composition. The chewing gum compositions of each layer comprise gum base in an amount of about 15 to about 60% by weight of the layer such that the difference in gum base content between the layers is about 3 to about 15% by weight. The chewing gum compositions of each layer also comprise sweeteners, flavors, and optionally, at least one other conventional chewing gum additive.

13 Claims, No Drawings

MULTI-LAYERED CHEWING GUM COMPOSITION HAVING DIFFERENT RATES OF FLAVOR RELEASE

REFERENCE TO RELATED APPLICATIONS

This application is a continuation of application Ser. No. 109,963 filed Oct. 19, 1987 now abandoned in turn, is a continuation-in-part of application Ser. No. 816,949 filed on Jan. 6, 1986, now abandoned which in turn is a continuation application of application Ser. No. 575,609 filed on Jan. 31, 1984 now abandoned.

FIELD OF THE INVENTION

This invention relates to a chewing gum of the two layer laminate type of which one layer has a high initial flavor release and the other layer has a longer lasting flavor release.

BACKGROUND

Chewing gum research has concentrated on the development of products that have a good taste and chew. This has been accomplished by adjusting gum base, flavor, sweetener content and flavor release characteristic. However, there has been difficulty in achieving easy bite, flavor impact, quick flavor release and sustained flavor in a single chewing gum composition.

U.S. Pat. No. 4,352,824 discloses a chewing gum composition having long lasting flavor. The desired result is accomplished by incorporating into the chewing gum a non-aqueous solid fatty or gelatinous material, e.g. butter. In order to provide initial flavor, a separate pre-sweetened or pre-flavored slab of conventional chewing gum is combined with the slab of gum containing the fatty or gelatinous material.

U.S. Pat. No. 4,352,823 discloses a coextruded gum having a soft core portion comprising a polyisobutylene elastomer and in excess of 1% and usually about 5% up to about 10% moisture surrounded by a harder shell of conventional gum composition. This patent relies on the combination of plasticizers (glyceryl triacetate and acetylated monoglyceride) to provide softness to the gum base.

Similarly, U.S. Pat. No. 4,352,825 discloses a coextruded gum having a soft center of high water content and containing a combination of at least two recrystallized sweeteners. No specific characteristic other than the physical characteristics of easy bite and easy chew are attributed to the soft gums of the prior art. The purpose is to provide a way for handling soft gum compositions in conventional wrapping machines. The soft gum composition is said to have an easy bite and chew.

The chewing gum compositions disclosed above are hydrous compositions—i.e., they have conventional or above conventional moisture levels. These levels of moisture can affect the stability of the composition through loss of the moisture resulting in staling. Those compositions having relatively high moisture levels usually are sticky and require special handling. Also, in attempts to reduce the likelihood of staling of hydrous gum compositions, non-transparent packaging has been utilized. The consumer is therefore unable to see how the product appears until the product is removed from the packaging. A welcome contribution to the art would be a gum composition having a sequential release of flavor (flavoring agents) which avoids the problems associated with the above described hydrous gum compositions. Another welcome contribution to the art would be a non-staling gum composition—i.e., an anhydrous composition—which can be packaged in transparent packaging materials so that the consumer has a visually enhanced appreciation of the product. Such a contribution is provided by this invention.

SUMMARY OF THE INVENTION

It has surprisingly been found that flavor impact and easy bite can be achieved in anhydrous chewing gum compositions through a non-homogeneous combination of chewing gum compositions wherein at least two combined compositions have differing base contents. An example of such a chewing gum composition is a multi-layer chewing gum composition wherein at least two layers comprise chewing gum compositions which differ in their gum base content. The flavor impact achieved is a quick release of flavor (flavoring agent) as well as a sustained flavor release. The quick release of flavor is obtained from the chewing gum composition having the lower gum base content whereas the sustained flavor release is obtained from the chewing gum composition having the higher gum base content. The flavoring agents used are generally liquids but optionally sprayed dried flavoring agents may be used. The degree of softness of the multi-layered chewing gum composition can also be controlled through the use of chewing gum compositions having differing gum base contents rather than having to rely on additional additives such as plasticizers and softeners.

The gum layers are laminated together by conventional methods, e.g., coextrusion, roller pressing, etc.

More specifically, this invention provides a multi-layered chewing gum composition, having a moisture content of less than about 1% by weight of said composition, comprising at least two layers wherein (A) a first layer comprises a chewing gum composition which comprises gum base in an amount of about 15 to about 60% by weight of the first layer composition, an effective amount of a flavoring agent, an effective amount of a sweetener, and optionally, effective amounts of at least one additional conventional chewing gum additive, such that the total of all ingredients in said first layer composition equals 100% of said first layer; and (B) a second layer comprises a chewing gum composition which comprises gum base in an amount of about 15 to about 60% by weight of the second layer composition, an effective amount of a flavoring agent, an effective amount of a sweetener, and optionally, effective amounts of at least one additional conventional chewing gum additive, such that the total of all ingredients in said second layer equals 100% by weight of said second layer; and wherein there is a difference in gum base content of about 3 to about 15% by weight between said first and second layers, and wherein the layers release the flavoring agents at different rates.

Since the anhydrous compositions of this invention are resistant to staling—i.e., non-staling—transparent type packaging materials may be used for the ultimate product. This is an added benefit because the consumer's appreciation for the ultimate product is visually enhanced. For example, the consumer is able to observe multicolor designs and color variations in the compositions of this invention.

DETAILED DESCRIPTION OF THE INVENTION

The compositions of this invention are anhydrous, that is, they have a total moisture content of less than 1% by weight of the composition, with not more than about 0.9% by weight being preferred and not more than about 0.3% by weight being most preferred. This is accomplished by utilizing chewing gum compositions that have the above mentioned moisture levels. Chewing gum compositions having these moisture levels are known in the art, see for example, U.S. Pat. No. 4,579,738 issued to Cherukuri et al on Apr. 1, 1986; U.S. Pat. No. 4,581,234 issued to Cherukuri et al on Apr. 8, 1986; and U.S. Pat. No. 4,587,125 issued to Cherukuri et al on May 6, 1986; the disclosures of each being incorporated herein by reference thereto.

The compositions of this invention comprise at least two different chewing gum compositions non-homogeneously combined that differ in gum base content, and may contain the same or different flavoring agents and the same or different sweeteners. In particular, the compositions of this invention are multi-layer and comprise at least two layers, a first layer and a second layer, which comprise chewing gum compositions of differing gum base content. More particularly, the compositions of this invention are two layered comprising a first layer chewing gum composition and a second layer chewing gum composition wherein the first layer composition and the second layer composition have differing base contents. The disclosure relating to the chewing gum compositions which comprise the compositions of this invention are applicable to two layered, multi-layered, and other non-homogeneous combinations of the chewing gum compositions.

The chewing gum compositions which comprise the compositions of this invention have a gum base content of about 15 to about 60% by weight of the composition containing such gum base. Preferably a first layer comprises a chewing gum composition having a gum base content of about 25 to about 35% by weight with about 27 to about 31% by weight being most preferred. Preferably a second layer comprises a chewing gum composition having a gum base content of about 28 to about 50% by weight with about 30 to about 40% by weight being preferred. The amount of gum base for the layers is suitably selected so that the difference in gum base content between the layers is about 3 to about 15% by weight with about 3 to about 10% by weight being preferred. Thus, for example, if the first layer composition contains gum base in an amount of about 25% by weight of said first layer, the second layer composition will contain gum base in an amount of about 28 to about 40% by weight of said second layer. The gum base used in the compositions of the different layers may be the same or different but is preferably the same.

The other components or ingredients of the compositions of the different layers, such as sweeteners and flavoring agents, may be the same or different and the amounts may be the same or different. As stated above the layer having the lower gum base content will exhibit a quick initial release of flavor and flavor impact and the layer having the higher base content will have a sustained release of flavor. Those layers with less gum base and rapid flavor release would be expected to have soft chew properties and those layers with a high gum base content and longer flavor release properties would be expected to have a harder chew.

The compositions of this invention result in a chewing gum laminate composite which has a differential release rate of flavor in each of the two layers. This differential release rate aspect of the invention may be utilized in the controlled release of other chewing gum adjunctives such as medicaments.

The gum base used in this invention may be any water-insoluble gum base well known in the art, and include those gum bases utilized for chewing gums and bubble gums. Illustrative examples of suitable polymers in gum bases include both natural and synthetic elastomers and rubbers. For example, those polymers which are suitable in gum bases include, without limitation, substances of vegetable origin such as chicle, crown gum, nispero, rosidinha, jelutong, perillo, niger gutta, tunu, balata, gutta-percha, lechi-capsi, sorva, gutta kay, mixtures thereof, and the like. Synthetic elastomers such as butadiene-styrene copolymers, polyisobutylenes, isobutylene-isoprene copolymers, polyethylenes, polyvinylacetates, mixtures thereof, and the like are suitable.

The gum base may include a non-toxic vinyl polymer, such as polyvinyl acetate and its partial hydrolysate, polyvinyl alcohol, and mixtures thereof. When utilized, the vinyl polymer may possess a molecular weight ranging from about 3,000 up to and including 94,000.

The gum base may contain conventional elastomer solvents. These solvents may comprise terpene resins, such as polymers of $\alpha$-pinene or $\beta$-pinene; methyl, glycerol or pentaerythritol esters of rosins or modified rosins, such as hydrogenated, dimerized or polymerized rosins or mixtures thereof. Examples of elastomer solvents suitable for use herein include pentaerythritol ester of partially hydrogenated wood or gum rosin, pentaerythritol ester of wood or gum rosin, glycerol ester of partially dimerized rosin, glycerol ester of polymerized rosin, glycerol ester of tall oil rosin, glycerol ester of wood or gum rosin and partially hydrogenated wood or gum rosin, and partially hydrogenated methyl ester of rosin and mixtures thereof. The elastomer solvent may be employed in an amount ranging from about 10% to about 75% and preferably about 45% to about 70% by weight of the gum base.

A variety of traditional ingredients used as plasticizers or softeners such as lanolin, palmitic acid, oleic acid, stearic acid, sodium stearate, potassium stearate, glyceryl triacetate, glycerin, lecithin, glyceryl monostearate, propylene glycol monostearate, mixtures thereof, and the like, may also be incorporated into the gum base to obtain a variety of desirable textures and consistency properties. Waxes, for example, natural waxes, petroleum waxes such as polyurethene waxes, polyethylene waxes, paraffin waxes and microcrystalline waxes may also be incorporated into the gum base to obtain a variety of desirable textures and consistency properties. These traditional ingredients are generally employed in amounts of up to about 30% by weight and preferably in amounts of about 1% to about 25% by weight and most preferably in amounts of from about 3% to about 20% by weight and more preferably in amounts of about 3 to about 10% by weight of the gum base.

The gum base may include effective amounts of mineral adjuvants such as calcium carbonate, magnesium carbonate, alumina, aluminum hydroxide, aluminum silicate, talc, tricalcium phosphate, dicalcium phosphate and the like; as well as mixture thereof. These mineral adjuvants may serve as fillers and texturizing agents.

The gum base may also include effective amounts of conventional additives such as antioxidants, preservatives, colorants and the like. For example, titanium dioxide may be utilized as a colorant, and an antioxidant such as butylated hydroxytoluene, butylated hydroxyanisole, propyl gallate, and mixtures thereof, may also be included.

The chewing gum compositions which make up the compositions of this invention may include effective amounts of conventional additives selected from the group consisting of plasticizers, softeners, emulsifiers, waxes, fillers, bulking agents, mineral adjuvants, colorings (colorants or coloring agents), antioxidants, thickeners, acidulents, mixtures thereof, and the like.

The plasticizers, softeners, mineral adjuvants, colorants, waxes, and antioxidants discussed above as being suitable for use in the gum base may also be used in the chewing gum compositions. Examples of the other conventional additives which may be used include emulsifiers, such as lecithin and glyceryl monostearate; thickeners, used alone or in conjunction with other softeners, such as methyl cellulose, alginates, carrageenan, xanthan gum, gelatin, carob, tragacanth, locust bean, and carboxy methyl cellulose; acidulents such as malic acid, citric acid, adipic acid, tartaric acid, fumaric acid, mixtures thereof, and the like; and fillers, such as those discussed above under the category of mineral adjuvants. The fillers may be used in amounts up to about 30% by weight with about of about 4% to about 25% by weight of the chewing gum composition being preferred.

Bulking agents suitable for use include sweetening agents selected from the group consisting of monosaccharides, disaccharides, polysaccharides, sugar alcohols, and mixtures thereof; polydextrose; maltodextrins; minerals such as calcium carbonate, talc, titanium dioxide, dicalcium phosphate, and the like; and the like. Bulking agents may be used in amounts up to about 90% by weight of the final gum composition with amounts of about 65% to about 85% being preferred.

The sweetening agent (sweetener) used may be selected from a wide range of materials including water-soluble sweetening agents, water-soluble artificial sweeteners, water-soluble sweetening agents derived from naturally occurring water-soluble sweeteners, dipeptide based sweeteners, and protein based sweeteners, including mixtures thereof. Without being limited to particular sweeteners, representative illustrations encompass:

A. Water-soluble sweetening agents such as monosaccharides, disaccharides and polysaccharides such as xylose, ribose, glucose (dextrose), mannose, galactose, fructose (levulose), sucrose (sugar), maltose, invert sugar (a mixture of fructose and glucose derived from sucrose), partially hydrolyzed starch, corn syrup solids, dihydrochalcones, monellin, steviosides, glycyrrhizin, and sugar alcohols such as sorbitol, xylitol, mannitol, maltitol, hydrogenated starch hydrolysate and mixtures thereof;

B. Water-soluble artificial sweeteners such as the soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (acesulfame-K) the free acid form of saccharin, and the like;

C. Dipeptide based sweeteners, such as L-aspartic acid derived sweeteners, such as L-aspartyl-L-phenylalanine methyl ester (aspartame) and materials described in U.S. Pat. No. 3,492,131, L-α-aspartyl-N-(2,2,4,4-tetramethyl-3-thietanyl)-D-alaninamide hydrate, methyl esters of L-aspartyl-L-phenylglycerine and L-aspartyl-L-2,5,dehydrophenylglycine, L-aspartyl-2,5-dihydro-L-phenylalamine; L-aspartyl-L-(1-cyclohexyen)-alanine; and the like;

D. Water-soluble sweeteners derived from naturally occurring water-soluble sweeteners, such as a chlorinated derivative of ordinary sugar (sucrose), known, for example, under the product designation of sucralose; and E. Protein based sweeteners such as thaumatoccous danielli (Thamatin I and II).

In general, an effective amount of sweetener is utilized to provide the level of bulk and/or sweetness desired, and this amount will vary with the sweetener selected. This amount will normally be 0.01% to about 90% by weight of the gum composition when using an easily extractable sweetener. The water-soluble sweeteners described in category A above, are usually used in amounts of about 25% to about 75% by weight, and preferably in amounts of about 50% to about 65% by weight of the final chewing gum composition. Some of the sweeteners in category A (e.g., glycyrrhizin) may be used in amounts set forth for categories B-E below due to the sweeteners known sweetening ability. In contrast, the sweeteners described in categories B-E are used in amounts of about 0.005% to about 5.0% and most preferably about 0.05% to about 2.5% by weight of the final chewing gum composition. These amounts are ordinarily necessary to achieve a desired level of sweetness independent from the flavor level achieved from flavor oils.

Preferred sugar based sweeteners are sugar (sucrose), corn syrup and mixtures thereof. Preferred sugarless sweeteners are the sugar alcohols, artificial sweeteners, dipeptide base sweeteners and mixtures thereof. Preferably the sugar alcohols are used in sugarless composition because they can be used at levels which are sufficient to provide bulk as well as the desired level of sweetness. Preferred sugar alcohols are selected from the group consisting of sorbitol, xylitol, mannitol, and mixtures thereof. Most preferably sorbitol or a mixture of sorbitol and mannitol is utilized. The gamma form of sorbitol is preferred. Generally, the sugar alcohols will not exceed about 75% by weight of the composition and are usually present in amounts of about 40 to about 75% by weight of the composition. Preferably, when present, sorbitol does not exceed 70% by weight, mannitol does not exceed 15% by weight, and xylitol does not exceed 65% by weight of the composition. An artificial sweetener or dipeptide based sweetener is preferably added to the composition containing sugar alcohols in the amounts described above for their category of sweetener. Of the artificial sweeteners the saccharin salts are preferred, and of the dipeptide based sweeteners aspartame is preferred.

The flavorings (flavoring agents) that may be used include those known to the skilled artisan, such as, natural and artificial flavors. These flavorings may be chosen from synthetic flavor oils and flavoring aromatics, and/or oils, oleo resins and extracts derived from plants, leaves, flowers, fruits and so forth, and combination thereof. Representative flavor oils include: spearmint oil, cinnamon oil, oil of wintergreen (methylsalicylate), peppermint oils, clove oil, bay oil, anise oil, eucalyptus oil, thyme oil, cedar leaf oil, oil of nutmeg, oil of sage, oil of bitter almonds and cassia oil. Also useful are artificial, natural or synthetic fruit flavors such as vanilla, and citrus oil, including lemon, orange, grape, lime and grapefruit and fruit essences including apple, pear, peach, strawberry, raspberry, cherry, plum, pineapple, apricot and so forth. These flavorings may be used individually or in admixture. Commonly used flavors include mints such as peppermint, menthol, artificial vanilla, cinnamon derivatives, and various fruit flavors, whether employed individually or in admixture.

Flavorings such as aldehydes and esters including cinnamyl acetate, cinnamaldehyde, citral diethylacetal, dihydrocarvyl acetate, eugenyl formate, p-methylamisol, and so forth may also be used. Generally any flavoring or food additive such as those described in *Chemicals Used in Food Processing*, pub 1274 by the National Academy of Sciences, pages 63-258 may be used.

Further examples of aldehyde flavorings include, but are not limited to: acetaldehyde (apple); benzaldehyde (cherry, almond); anisic aldehyde (licorice, anise); cinnamic aldehyde (cinnamon); citral, i.e., alpha citral (lemon, lime); neral, i.e. beta citral (lemon, lime); decanal (orange, lemon); ethyl vanillin (vanilla, cream); heliotropine, i.e., piperonal (vanilla, cream); vanillin (vanilla, cream); alpha-amyl cinnamaldehyde (spicy fruity flavors); butyraldehyde butter, cheese); valeraldehyde butter, cheese); citronellal (modifies, many types); decanal (citrus fruits); aldehyde C-8 (citrus fruits); aldehyde C-9 (citrus fruits); aldehyde C-12 (citrus fruits); 2-ethyl butyraldehyde (berry fruits); hexenal, i.e., trans-2 (berry fruits); tolyl aldehyde (cherry, almond); veratraldehyde (vanilla); 2,6-dimethyl-5-heptenal, i.e., Melonal (melon); 2,6-dimethyloctanal (green fruit); and 2-dodecenal (citrus, mandarin); cherry; grape; strawberry shortcake; mixtures thereof; and the like.

The amount of flavoring employed is normally a matter of preference subject to such factors as flavor type, individual flavor, gum base and strength desired. Thus, the amount may be varied in order to obtain the result desired in the final product. Such variations are within the capabilities of those skilled in the art without the need for undue experimentation. In general, amounts of about 0.05% to about 3.0% are suitable and amounts of about 0.5% to about 3.0% by weight of the chewing gum composition are useable with amounts of about 0.3% to about 1.5% being preferred and amounts of about 0.7% to about 1.2% being most preferred.

The coloring agents are used in amounts effective to produce the desired color. The coloring agents (colorants) useful in the present invention, include the pigments such as titanium dioxide, which may be incorporated in amounts of up to about 2% by weight of the gum composition, and preferably less than about 1% by weight. Colorants may also include natural food colors and dyes suitable for food, drug and cosmetic applications. These colorants are known as F.D. & C. dyes and lakes. The materials acceptable for the foregoing spectrum of use are preferably water-soluble, and include indigoid dye, known as F.D. & C. Blue No. 2, which is the disodium salt of 5,5-indigotindisulfonic acid. Similarly, the dye known as F.D. & C. Green No. 1 comprises a triphenylmethane dye and is the monosodium salt of 4-[4-N-ethyl-p-sulfobenzylamino)diphenylmethylene]-[1-N-ethyl-N-p-sulfoniumbenzyl)-$\Delta^{2,5}$-cyclohexadienimine]. A full recitation of all F.D. & C. and F.D. & C. dyes and their corresponding chemical structures may be found in the Kirk-Othmer Encyclopedia of Chemical Technology, at Volume 5, Pages 857-884, which text is accordingly incorporated herein by reference.

The chewing gum compositions which make up the compositions of this invention may contain an edible food material which is capable of being formed into particles having microporous channels. The particles have preferred low bulk densities in the range of about 3.0 to about 8 lb./ft.$^3$ and preferably about 3.0 to about 6.0 lb./ft.$^3$.

The optionally included spherical particles may be produced from a wide range of materials. Without being limited thereto, illustrative materials are carbohydrates such as the dextrins, starch, pectin, algin, methyl cellulose, carboxy methyl cellulose, carboxy methyl amylose, carboxyl methylamylopectin, dextrose, fructose, maltose, lactose, dextrins, natural gums and mixtures thereof. Exemplary natural gums include tragacanth, acacia, arabic, locus bean, caraya, and carragean. Although the spherical particles are not critical, it is preferred that they be present as a means of increasing the juiciness of the chewing gum. The fine, porous nature of the spherical particles immediately absorb moisture from saliva when the chewing gum product is masticated. The particles swell and impart a juiciness to the gum.

Such materials are commercially available and may be prepared by spray drying previously expanded particles in a heated zone. For illustrative purposes, however, a preferred process for preparing the spherical particles useful in the instant formulations is described in U.S. Pat. No. 4,180,593 to Cohan, the disclosure of which is incorporated herein by reference thereto. Briefly the reference process involves spraying a flowable composition in the presence of a blowing agent, such as ammonium bicarbonate, to form beads, subjecting the beads to a heated zone to expand the beads by expansion of gases within the interior of the beads, and cooling the resulting expanded beads to stop further expansion and aid in control of bulk density.

The optionally-included spherical particles are employed in the chewing gum compositions in amounts of about 0.1% to about 12% by weight and preferably about 0.5% to about 6% by weight based on the weight of the chewing gum composition layer. Amounts less than 0.1% fail to achieve enhanced flavor and sweetness perception whereas amounts higher than 12% do not achieve a pleasing flavor sweetness release.

The preferred spherical particle for use with this invention is a maltodextrin. This maltodextrin is distinct from known maltodextrins which have distinct particle sizes and are void of a microporous channel structure. Such conventional maltodextrins or corn syrup solids as they are commonly referred to, have bulk densities from 15 to 46 lb./ft.$^3$ and D.E. values from 7 to 38. Such materials are unsuitable for use in the present invention in lieu of the microporous particles. It should be recognized that such maltodextrins may be used in the instant formulations in addition to the spherical microporous particles. When used in this manner, they may be used in conventional amounts well known to those skilled in the art.

Although two layers having differential flavor release properties is the preferred embodiment of the multi-layered chewing gum compositions, as stated above, a multitude of layers, each having different flavor release capabilities is within the intended scope of this invention.

The anhydrous chewing gum compositions may be produced in accordance with the method disclosed in U.S. Pat. Nos. 4,579,738, 4,581,234, and 4,587,125 to Cherukuri et al cited above. In brief, a method or process comprises softening the base between a temperature range of about 40° C. to about 60° C.; admixing softening agents, sweetening agents and flavoring agents; extruding the composition prior to cooling; forming the composition into suitable chewing gum pieces without cooling; and immediately wrapping the pieces with a minimum of protective wrapping without prior conditioning. No moisture or moisture-containing ingredients are used and the chewing gum composition has a final moisture content of up to about 0.9% by weight.

The chewing gum composition layers are laminated to one another in any of the techniques known in the art. For example, upon cooling the chewing gum compositions, they can be coextruded by known techniques to form a two-layer laminate. Alternatively, the two layers may be independently formed and then stacked, one upon the other, and passed through nip rolls.

Since the low gum base content layer has a quick flavor release, it will generally contain a lesser amount of flavoring agent than the high base content slower flavor release layer. However, it is within the scope of this invention to have both layers contain the same amount of flavoring or either of them may have more flavoring than the other. Similarly, different compatible flavors may be selected for inclusion in each of the different layers. For example, the first layer may contain banana; the second layer strawberry. Other flavor combinations include orange/pineapple, lemon/lime, etc.

It is also within the scope of this invention to prepare mixtures of the low gum base content and high gum base content chewing gum compositions of this invention under conditions that do not cause homogenization of the two compositions. This can be accomplished by mixing the two compositions at room temperature. For example, ropes of a low gum base content composition can be braided with ropes of a high gum base content composition and rolled into sheets. In another embodiment two or more compositions of different gum base content are coextruded into sheets in a low shear extruder to avoid homogenization.

While low gum base compositions are known to have easy bite, they are not readily handled on conventional packaging equipment. By using the combination of compositions as herein disclosed the overall chewing gum composition retains the easy bite of the low base composition and is readily handled on conventional packaging equipment.

It is within the scope of this invention to include medicaments in the low base content chewing gum composition of this invention. The medicaments or other active agents included in the composition are quickly and substantially entirely released from the gum composition upon chewing. The term active agent as used in the specification and claims means any drug, medicament or other substance taken for its medicinal or dietary properties.

Illustrative, non-limiting examples of active agents which can be incorporated in the low gum base chewing gum composition of this invention include benzocaine, phenolphthaline, laxatives, lobeline sulfate (no smoking aid), calcium carbonate and magnesium carbonate as antacids, aspirin, fluorides for tooth decay prevention, nicotine as a smoking substitute, vitamins, minerals, caffeine, citrated caffeine, caffeine sodiun benzoate, caffeine hydrochloride, appetite suppressants, and the like.

The active agent comprises about 1 to about 10% by weight of the low base content chewing gum composition, preferably about 1 to about 5% by weight, more preferably about 2% to about 4%, e.g. 3%. For example, vitamin C is included in the chewing gum composition at about 60 mg per stick, i.e., about 2.7% by weight. Appetite suppressing gums can include about 5 mg of benzocaine per stick.

While this invention has been described in terms of preparing two separate chewing gum compositions, it is within the scope of this invention to prepare a single chewing gum composition having a gum base content of about 15 to about 60% by weight, dividing the composition into two ketches and adding a diluent to one ketch to reduce its base content so that it differs by about 3 to about 15% by weight. Suitable diluents include xylitol, mannitol and sorbitol.

Those skilled in the art will appreciate that the total amount of all ingredients (components) used in the chewing gum compositions of this invention equals 100% by weight of the composition. Also, unless stated otherwise, all percents herein are percent by weight of the composition.

The following examples are illustrative only and should not be construed as limiting the invention in any way. Those skilled in the art will appreciate that variations are possible which are within the spirit and scope of the appended claims.

In the examples of the compositions of this invention that follow the chewing gum compositions were prepared by softening the gum base at about 135° F. and then blending in the lecithin for about 3 minutes. Then about ½ of the sweeteners along with any liquid flavoring and other ingredients were blended in for about 4 minutes with the flavor being added about 2 minutes into the 4 minute blending procedure. Finally the remaining sweeteners and any solid flavors were added in and blended for about 3 minutes and then the resulting gum composition was extruded into the desired shape. The formulations for Examples 1–4 illustrating compositions of this invention are set forth in Table I and the formulations for Examples 5 to 7 illustrating compositions of this invention are set forth in Table II.

TABLE I

| Ingredients | % by wt. of Composition | | | |
|---|---|---|---|---|
| | 1 | 2 | 3 | 4 |
| First Layer | | | | |
| Gum Base | 30.0 | 28.5 | 30.0 | 30.0 |
| Maltodextrin* | 4.0 | 4.0 | 4.0 | 4.0 |
| Sugar | 62.175 | 64.45 | 58.25 | 63.4 |
| Dextrose | 6.0 | — | 6.0 | — |
| Flavors | 1.3 | 1.6 | 1.25 | 2.0 |
| Lecithin | 0.5 | 0.5 | 0.5 | 0.5 |
| Color | 0.025 | 0.2 | — | 0.1 |
| Malic Acid | — | 0.5 | — | — |
| Citric Acid | — | 0.25 | — | — |
| Second Layer | | | | |
| Gum Base | 34.0 | 32.0 | 34.0 | 37.0 |
| Maltodextrin* | 4.0 | 4.0 | 4.0 | 4.0 |
| Sugar | 52.15 | 61.9 | 52.4 | 57.3 |
| Dextrose | 6.0 | — | 6.0 | — |
| Flavors | 3.25 | 1.0 | 3.0 | 1.2 |
| Lecithin | 0.5 | 0.5 | 0.5 | 0.5 |
| Color | 0.1 | 0.1 | 0.1 | — |

TABLE I-continued

| Ingredients | % by wt. of Composition | | | |
|---|---|---|---|---|
| | 1 | 2 | 3 | 4 |
| Malic Acid | — | 0.5 | — | — |

*Bulk density of about 3.0 to about 8 lb./ft.$^3$

TABLE II

| Ingredients | % by wt. of Composition | | |
|---|---|---|---|
| | 5 | 6 | 7 |
| First Layer | | | |
| Gum Base | 30.0 | 30.0 | 28.5 |
| Maltodextrin* | 4.0 | 4.0 | 4.0 |
| Sugar | 63.05 | 63.9 | 59.8 |
| Dextrose | — | — | 6.0 |
| Flavors | 1.5 | 1.5 | 1.35 |
| Lecithin | 0.5 | 0.5 | 0.5 |
| Color | 0.2 | 0.1 | 0.1 |
| Malic Acid | 0.5 | — | — |
| Citric Acid | 0.25 | — | — |
| Second Layer | | | |
| Gum Base | 37.0 | 37.0 | 37.5 |
| Maltodextrin* | 4.0 | 4.0 | 4.0 |
| Sugar | 57.2 | 56.9 | 52.15 |
| Dextrose | — | — | 6.0 |
| Flavors | 1.2 | 1.7 | 2.0 |
| Lecithin | 0.5 | 0.5 | 0.25 |
| Color | 0.1 | 0.1 | 0.1 |

*Bulk density of about 3.0 to about 8 lb./ft.$^3$

Table III sets forth the flavors and colors used in Example 1-7.

TABLE III

| Examples | Component | First Layer | Second Layer |
|---|---|---|---|
| 1 | Flavor | Spearmint blend | Spearmint blend (1) |
| 1 | Color | Green | Green |
| 2 | Flavor | Orange | Pineapple |
| 2 | Color | Yellow | Yellow |
| 3 | Flavor | Peppermint blend | Peppermint blend (2) |
| 3 | Color | — | Blue |
| 4 | Flavor | Strawberry | Vanilla marshmallow |
| 4 | Color | Red | — |
| 5 | Flavor | Orange | Pineapple |
| 5 | Color | Yellow | Yellow |
| 6 | Flavor | Banana | Strawberry |
| 6 | Color | Yellow | Red |
| 7 | Flavor | Banana | Strawberry |
| 7 | Color | Yellow | Red |

(1) contains 2.0% encapsulated spearmint
(2) contains 2.0% encapsulated peppermint In the examples that contained a different flavoring agent in the second layer than in the first, the resulting two layered chewing gum compositions upon chewing had an initial release of the first layer flavor followed by a commingling of first and second layer flavors followed by a distinct sustained second layer flavor. In the examples wherein the flavor was essentially the same in the first and second layers there was an initial flavor release and a sustained flavor release.

The invention thus being described, it will be obvious that the same may be varied in many ways. Such variations are not to be regarded as a departure from the spirit and scope of the invention and all such modifications are intended to be included within the scope of the claims.

What is claimed is:

1. A chewing gum product having at least two layers, which provides easy bite and combined quick flavor release and sustained flavor release comprising:
   (a) a first layer with an anhydrous composition having a content of less than 1% by weight of moisture, a gum base content of from about 25% to about 35% by weight of said first layer anhydrous composition, and an effective amount of flavoring agent and/or sweetener to provide quick flavor release from said product, and
   (b) a second layer with an anhydrous composition having a content of less than 1% by weight of moisture, a gum base content of from about 28% to about 50% by weight, and an effective amount of flavoring agent and/or sweetener to provide sustained flavor release from said product;
said base content of said second layer being 3% to 15% greater than said base content of said first layer, whereby said combined quick flavor release and sustained flavor release are provided in said gum product.

2. The chewing gum product of claim 1 wherein said first layer has a gum base content of 27% to about 31% by weight, and said second layer has a gum base content of from about 30% to about 40% by weight.

3. The chewing gum product of claim 1 wherein the difference in gum base content between said first and second layers is from about 3% to about 10% by weight.

4. The chewing gum product of claim 1 wherein the flavoring agent is the same for said first and said second layers.

5. The chewing gum product of claim 1 wherein the flavoring agent for said first layer is different from the flavoring agent of said second layer.

6. The chewing gum product of claim 1 wherein the flavoring agents are selected from the group consisting of synthetic flavor oils, flavoring aromatics, oleoresins, extracts derived from plants, leaves, flowers and fruits, and mixtures thereof.

7. The chewing gum product of claim 1 wherein the flavoring agents are selected from the group consisting of spearmint oil, cinnamon oil, oil of wintergreen, peppermint oil, clove oil, anise oil, eucalyptus oil, vanilla, lemon oil, orange oil, grape oil, lime oil, grapefruit oil, apple essence, pear essence, peach essence, strawberry essence, raspberry essence, cherry essence, plum essence, pineapple essence, apricot essence, banana flavor, and mixtures thereof.

8. The chewing gum product of claim 1 wherein said sweetener is selected from the group consisting of water-soluble sweetening agents, water-soluble artificial sweetening agents, dipeptide based sweetening agents, water-soluble sweetening agents derived from naturally occurring water-soluble sweetening agents, protein based sweeteners, and mixtures thereof.

9. The chewing gum product of claim 1 wherein said sweetener is selected from the group consisting of xylose, ribose, glucose, mannose, galactose, fructose, sucrose, maltose, invert sugar, partially hydrolyzed starch, corn syrup solids, dihydrochalcones, monellin, steviosides, glycyrrhizin, sorbitol, xylitol, mannitol, maltitol, hydrogenated starch hydrolysate, saccharin acid, saccharin salts, cyclamate salts, acesulfame-K, L-aspartyl-L-phenylalanine methyl ester, L-α-aspartyl-N-(2,2,4,4-tetramethyl-3-thietanyl)-D-alaninamide hydrate, chlorinated derivatives of sucrose, thaumatin, and mixtures thereof.

10. The chewing gum product of claim 1 wherein said sweetener is selected from the group consisting of monoglycerides, disaccharides, polysaccharides, and mixtures thereof.

11. The chewing gum product of claim 1 wherein said sweetener is selected from the group consisting of sugar alcohols, artificial sweeteners, dipeptide based sweeteners and mixtures thereof.

12. The chewing gum product of claim 1 wherein there is further included at least one additional conventional gum additive selected from the group consisting of plasticizers, softeners, emulsifiers, waxes, fillers, bulking agents, mineral adjuvants, flavorings, colorants, antioxides, and mixtures thereof.

13. The chewing gum product of claim 1 wherein there is only said first layer and said second layer.

* * * * *